May 5, 1970  W. R. ORLOFF  3,510,775
IN-CIRCUIT SEMICONDUCTOR LEAKAGE TESTING MEANS AND METHOD
Filed March 16, 1967
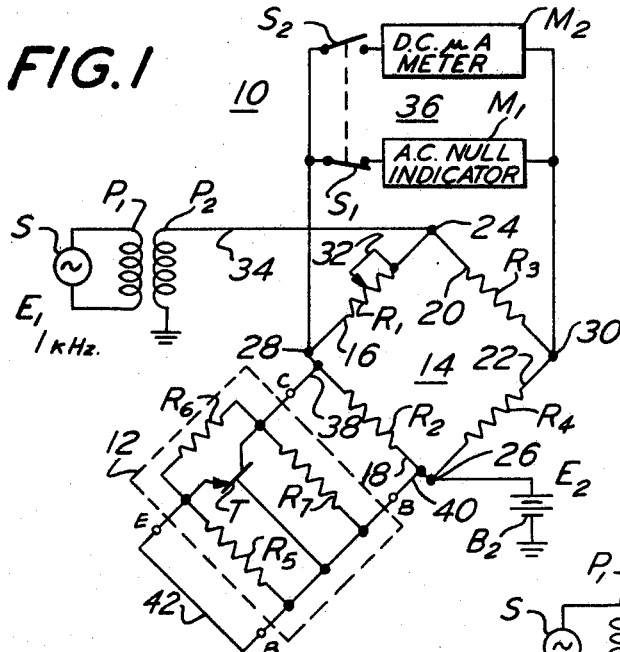
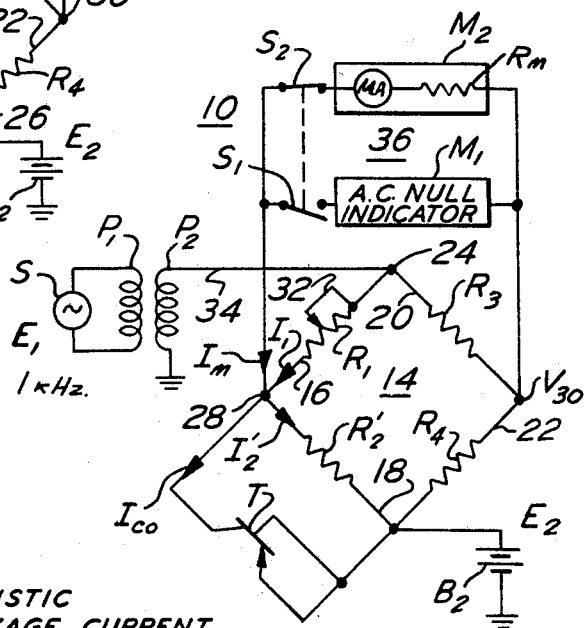
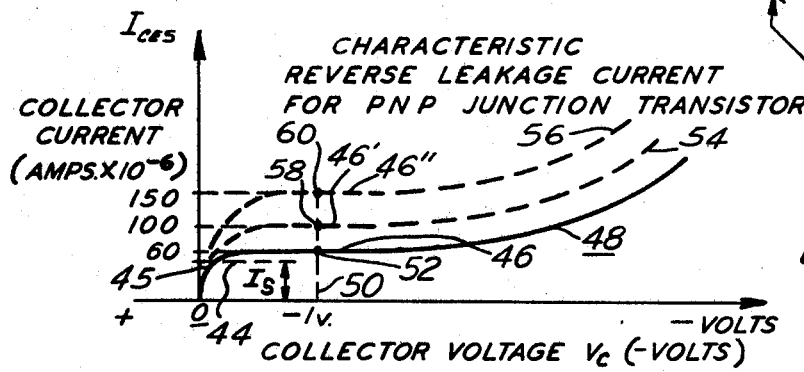
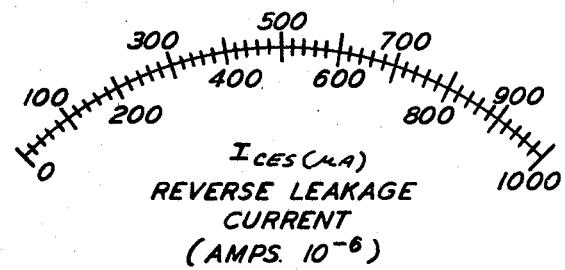
INVENTOR
WILLIAM R. ORLOFF
BY  *Jacob Trachtman*
ATTORNEY

United States Patent Office 3,510,775
Patented May 5, 1970

3,510,775
IN-CIRCUIT SEMICONDUCTOR LEAKAGE
TESTING MEANS AND METHOD
William R. Orloff, Lansdale, Pa., assignor to American
Electronic Laboratories, Inc., Colmar, Pa., a corporation of Pennsylvania
Filed Mar. 16, 1967, Ser. No. 623,739
Int. Cl. G01r 31/22
U.S. Cl. 324—158
14 Claims

ABSTRACT OF THE DISCLOSURE

The method and means for testing the leakage of a semiconductor junction which takes into account and minimizes the effect of conduction by in-circuit linear resistance elements associated with the semiconductor junction being tested and includes the use of a Wheatstone bridge for balancing out the effect of resistance to an alternating signal and sensing the current produced by a D.C. signal for indicating leakage current for the semiconductor junction under test.

---

The invention relates to a method and apparatus for testing the reverse leakage current of a semiconductor junction, and more particularly to a method and means for testing the reverse leakage current of a semiconductor junction of a semiconductor device such as a semiconductor diode or transistor, while such a device is connected in a circuit.

Heretofore, semiconductor junction testing devices for testing or measuring the reverse leakage current of a semiconductor diode or transistor have been provided. However, such devices require the removal of the device being tested from the circuit in which it is connected or the cutting of certain leads of the in-circuit device to remove the effects of other components or elements connected with it in the circuit. This requirement, results in increasing the difficulty and time required for testing such in-circuit devices, as well as increasing the possibility of damage to the components involved in disconnecting or reconnecting such elements.

It is therefore a principal object of this invention to provide a new and improved method and apparatus for measuring the reverse leakage current of a semiconductor junction while such a device is connected in-circuit and without requiring the disconnecting of any portion thereof.

Another object of the invention is to provide a new and improved method and apparatus for measuring the reverse leakage current of a semiconductor junction of a semiconductor device while minimizing the possible damage to the device or the circuitry in which it is connected.

Another object of the invention is to provide a new and improved method and apparatus of testing the reverse leakage current of a semiconductor junction of a semiconductor device which provides an indication of good accuracy of the reverse leakage current of the device under test.

Another object of the invention is to provide a new and improved method and apparatus for testing the reverse leakage current of a semiconductor junction of a semiconductor device having great ease and reliability of operation.

Another object of the invention to provide a new and improved method and apparatus for testing the reverse leakage current of a semiconductor junction of a semiconductor device having great versatility in allowing the testing of junctions of various devices including semiconductor diodes and transistors, by appropriate connection therewith, and with minimum risk of damaging such devices.

The above objects, as well as many other objects of the invention, are achieved by providing a method of testing the reverse leakage current of a semiconductor junction device while it is connected in a circuit, which comprises the steps of, applying a signal to a semiconductor junction device while it is connected in a circuit and forward current therethrough is absent, said signal comprising a D.C. component reverse biasing the junction of said device which is to have its leakage current measured to its saturation current region and an A.C. component having an amplitude which is small with respect to said D.C. component for varying the signal applied to said junction about the point in the saturation current region at which the reverse leakage current is to be tested, measuring the dynamic resistance of said in-circuit device with respect to the A.C. component of the signal, measuring the D.C. current flow responsive to said D.C. component of said signal when applied as stated above, and reducing the D.C. current so measured, by the amount of D.C. current flowing through resistance equal in value to the resistance measured with respect to the A.C. signal component, to provide a measure of the reverse leakage current of the device.

A further method of testing the reverse leakage current of a semiconductor junction device which is connected in a circuit comprises the steps of, applying a signal to a semiconductor junction device while it is connected in a circuit and forward current therethrough is absent, said signal comprising a D.C. component reverse biasing the junction of said device to a point in the saturation current region at which its reverse leakage current is being measured and an A.C. component of smaller amplitude than said D.C. component for varying the applied voltage within the saturation region about the said point at which the reverse leakage current is being measured, and sensing a signal related to the direct current provided by the application of a D.C. component of said signal which is reduced by the amount of the D.C. current component caused to flow by said D.C. component of said signal through a resistance equal in value to the resistance provided to the A.C. component of said signal when applied to said device while said device is connected in said circuit and forward current therethrough is absent for measuring reverse leakage current of said device.

The method further provides for applying said signal to the semiconductor junction of a device through an arm of a Wheatstone bridge which receives said signal across the pair of signal input nodes of said bridge, and the signal which is sensed for indicating leakage current is derived from the pair of signal output nodes of said bridge when said bridge is balanced to minimize the amplitude of the A.C. component of said signal at its said output nodes. The method also provides for measuring the reverse leakage current between the base and collector junction of a transistor by short circuiting the emitter directly to the base of said transistor to prevent forward current therethrough.

The foregoing and other objects of the invention will become more apparent as the following detailed description of the invention is read in conjunction with the drawings, in which:

FIG. 1 is a schematic drawing of a circuit embodying the semiconductor leakage testing means of the invention illustrating its use for testing the reverse leakage conduction of a PNP transistor which is connected in a circuit without removing or severing same from said circuit, FIG. 2 is a schematic drawing of an equivalent circuit of the circuit shown in FIG. 1, FIG. 3 is a graphical representation of characteristic reverse leakage current for a PNP junction transistor, and FIG. 4 is a plan drawing of a scale for indicating reverse leakage current employed by the microammeter of the detecting means shown in FIG. 1.

Like reference numerals designate like parts throughout the several views.

Refer to FIG. 1 which is a schematic drawing disclosing an in-circuit semiconductor leakage testing means 10 embodying the invention. The testing means 10 of FIG. 1 is illustrated particularly in connection with the testing of a PNP type transistor T connected in a circuit indicated within the dashed lines 12. The means 10 of course may be used for testing semiconductor junctions of other devices, such as semiconductor diodes, as will be readily apparent from the description given of the means 10 in connection with the testing of the reverse leakage current of the transistor T.

The testing means 10 includes a Wheatstone bridge 14 comprising four arms 16, 18, 20 and 22, each respectively provided by a resistor $R_1$, $R_2$, $R_3$ and $R_4$. The junction of the arms 16 and 20 provides a signal input node 24, while the junction of the arms 18 and 22 provides the second signal input node 26 of the pair of signal input nodes of the Wheatstone bridge 14. Similarly, the junction of the arms 16 and 18 provides a signal output node 28, while the junction of the arms 20 and 22 provides the signal output node 30 of the pair of signal output nodes of the Wheatstone bridge 14. The resistor $R_1$ provides a variable resistance by the provision of a shorting tap 32 for the purpose of balancing the Wheatstone bridge 14 as will be described in greater detail below.

A signal source S providing an alternating signal which may be a sinusoidal wave with a frequency of one kilohertz and a voltage $E_1$, drives the primary winding $P_1$ of a transformer having a secondary output winding $P_2$. The output winding $P_2$ is grounded at its bottom end and has its other top end connected by a lead 34 to the signal input node 24 of the bridge 14. The signal input node 26 is connected to the positive terminal of a D.C. voltage source $B_2$ which may be a battery having its negative terminal returned to ground potential. The D.C. voltage source $B_2$ provides an output potential of $E_2$.

A signal detecting means 36 includes an A.C. null indicator $M_1$ and a D.C. current sensing meter or microammeter $M_2$. The indicator $M_1$ is connected through a switch $S_1$ between the signal output nodes 28 and 30 of the Wheatstone bridge 14. The switches $S_1$ and $S_2$ are interconnected so that either the indicator $M_1$ or the meter $M_2$ of the detecting means 36 is connected between the signal output nodes 28 and 30.

The testing means 10 is provided with output means in the form of output leads 38, 40 for connection to opposite sides of the semiconductor junction which is to have its reverse leakage current tested. The lead 38 is connected to the node 28, while the lead 40 is connected to the node 26 of the Wheatstone bridge 14.

In operation, when the testing means 10 is to be used for testing the reverse leakage current of a transistor which is in circuit, the transistor T may be illustrated by the schematic form shown within the dashed line 12 of FIG. 1. The transistor T which for purposes of illustration is a PNP type, is shown connecting in a circuit providing a resistor $R_5$ connected between its emitter and base electrodes, a resistor $R_6$ connected between its emitter and collector electrodes, and a resistor $R_7$ connected between its base and collector electrodes. While the transistor T remains connected in circuit, the output lead 38 is connected to its collector electrode C, while the output lead 40 is connected to its base electrode B. With this arrangement, the D.C. source $B_2$ supplies a reverse biasing potential between the base and collector junction of the transistor T, by applying a positive potential to the base, and a negative potential to the collector of the transistor T. In the case where the transistor being tested is a NPN type, then, as is well known, the applied potential is reversed for the purpose of obtaining reverse biasing of such a transistor. In order to obtain the reverse leakage current between the base and collector of the transistor T and to assure the absence of forward current through the transistor T, the emitter electrode E and the base electrode B may be short circuited by the lead 42 shown in FIG. 1. Under such conditions, the reverse leakage current of the transistor T which is tested or measured will be the leakage current with the emitter to base electrodes shorted and technically known by the symbol $I_{CES}$.

FIG. 2 is a schematic drawing of an equivalent circuit of that shown in FIG. 1 incorporating therein the in-circuit transistor shown within the dashed region 12 of FIG. 1 and with the switches $S_1$ and $S_2$ reversely positioned. It will be noted from FIG. 1 that with the emitter electrode E and base electrode B shorted, the resistors $R_2$, $R_6$ and $R_7$ are connected parallel to each other, while the resistor $R_5$ is short circuited. In FIG. 2, the parallel combination of the resistors $R_2$, $R_6$ and $R_7$ is represented by the single resistor $R_2'$, while the collector of transistor T is connected to the node 28, and the base and emitter electrodes are connected to the node 26 of the bridge 14.

In the operation of the testing means 10 after the output leads 38 and 40 are connected to the device to be tested to produce the reverse bias across the semiconductor junction which is to have its leakage current tested, and in the absence of forward current through the device, the switch $S_1$ is closed and the switch $S_2$ is opened as shown in FIG. 1, and the resistance of the resistor $R_1$ of the arm 16 is adjusted by moving the tap 32 to provide a minimum A.C. signal at the indicator $M_1$ of the detecting means 36.

When such a minimum or null of the A.C. signal is obtained, the bridge 14 is in its balanced condition for the A.C. signal. With the bridge 14 maintained in such balanced condition, the switch $S_2$ which was opened is now closed, while the switch $S_1$ is moved to its open condition. The microammeter $M_2$ now provides a reading of the reverse leakage current $I_{CES}$ which may be read from a scale such as shown in FIG. 4. Thus, the scale of the meter $M_2$ is calibrated to indicate directly the reverse leakage current of the semiconductor junction being measured which in the case of a transistor in which the emitter and base electrodes are short circuited as shown, for example, in the FIG. 1, the scale provides a direct reading of $I_{CES}$. In the case of a semiconductor diode the device would indicate the reverse current $I_R$. Since typical values of reverse leakage current for transistors and diodes of various types are tabulated and readily available, the reading provided by the meter $M_2$ serves to indicate whether such current is typical or excessive and allows an evaluation of whether the semiconductor device is defective.

For an explanation of the manner in which the method and means 10 operate to produce the desired results while the semiconductor device is connected in circuit, refer to FIG. 3 which is a graphic representation of the characteristic reverse leakage current for a PNP junction transistor.

The reverse leakage current of a semiconductor junction, generally is referred to as $I_R$ for diodes and as $I_{CO}$ for transistors and comprises a substantially constant saturation current $I_S$ which depends upon the physics of the semiconductor junction such as the starting resistivity, doping levels, junction area and geometry. These quantities are not dependent on factors such as aging. Although the saturation current $I_S$ is a function of temperature, it exhibits a recoverable, predictable value with temperature changes. In addition to the saturation current $I_S$, a current component is also present in $I_{CO}$ or $I_R$ as a result of impurities, moisture, surface imperfections or combinations of these conditions. This additional component of the reverse leakage current does not exhibit recoverable phenomena and steadily deteriorates and constitutes the current component exceeding the current saturation value $I_S$ represented by the dashed line 44 in FIG. 3. Thus a reverse leakage current which exceeds a given value at a designated reverse bias voltage for a particular transistor or diode may be considered to indicate a defective device.

Thus in FIG. 3 the solid curve 48 indicates the typical reverse leakage current of a PNP junction transistor, while the dashed curve 54 indicates the maximum reverse leakage current of a particular PNP junction transistor which is not defective. On the other hand, the dashed curve 56 indicates excessive reverse leakage current for the particular transistor, indicating that it is defective and should be replaced. Thus in reading the graph of FIG. 3 for the particular PNP junction transistor which is characterized thereby, it indicates that a typical value of reverse leakage current is 60 microamperes at the point 52 for minus 1 volt reverse bias potential, while the maximum reverse leakage current for the applied minus 1 volt is given as 100 microamperes by the point 58 of the curve 54. Similarly, the point 60 on the curve 56 gives a reverse leakage current of 150 microamperes exceeding the maximum value of 100 microamperes and indicating a defective transistor.

Considering the curve 48 in detail, with the application of the reverse bias voltage $V_C$ to the semiconductor junction, the collector current at the region 45 rises sharply and rapidly approaches its saturation value $I_S$ indicated by the dashed line 44. After attaining its saturation current $I_S$, further increase in the negative potential $V_C$ results in a slow rise in the collector current $I_{CES}$ in the saturation region 46 of the curve 48 of FIG. 3.

The saturation region 46 of the curve 48 has a small slope indicating a high dynamic resistance. The static resistance of the semiconductor junction of the transistor device is indicated by the slope of the line joining the point on the curve 46 under consideration with the origin 0 of the graph of FIG. 3. As evident from the curve 48, the static resistance of a point on the saturation region 46 of the curve 48 is much lower than the dynamic resistance of such point. As an example of the operation of the method and testing means, consider the direct voltage source $B_2$ to apply a direct voltage to the semiconductor junction of the transistor T having a value of minus 1 volt. This is indicated by the vertical dashed line 50 of FIG. 3. With the application of minus 1 volt, the point 52 indicates a static operating point on the curve 48 for the transistor T to which the graph applies. For further purposes of illustration, assume that the A.C. signal of 1 kilohertz provides an A.C. signal with peak to peak voltage of .05 millivolt across the reverse biased junction of the transistor T. The applied voltage including the combination of the D.C. and A.C. components, results in the oscillation of the signal about the point 52 within the saturation region 46 of the reverse leakage current curve 48 of FIG. 3.

With respect to the alternating signal, the semiconductor junction provides a high resistance, as indicated by the small slope of the curve 48 at the operating point 52 in FIG. 3. Thus, with the bridge 14 balanced to provide a null or minimum A.C. signal at the indicator $M_1$ of the detecting means 36, the high resistance provided by the semiconductor junction has very little effect upon the balancing of the Wheatstone bridge 14. The Wheatstone bridge 14, however, is balanced with respect to the equivalent resistance $R_2'$ including the in-circuit resistors $R_6$ and $R_7$ in parallel with the resistor $R_2$ of the arm 18. This is evident from FIG. 2 which indicates the equivalent resistance $R_2'$ connected between the nodes 28, 26 with the junction of the transistor T connected in parallel thereacross. For the purpose of the A.C. signal the transistor T may be removed as an effective component because of its high resistance to the A.C. signal at the operating point 52 illustrated in FIG. 3.

With the bridge 14 adjusted to its balanced condition minimizing the A.C. signal detected by the indicator $M_1$ of the detecting means 36, the D.C. microammeter $M_2$ is connected across the signal output terminals 28, 30 of the network 14 by closing the switch $S_2$ while the indicator $M_1$ is removed from the circuit by opening of the switch $S_1$. The meter $M_2$ now provides an indication of the reverse leakage current while the bridge 14 remains in its previously set, balanced condition with respect to the A.C. signal. For the present reading of the meter $M_2$, the A.C. signal is not necessary and may, if desired, be removed. Since the bridge 14 has not been balanced to provide a minimum or null signal for the static or D.C. voltage provided by the source $B_2$, current flows through the meter $M_2$ which operates to provide upon the calibrated scale shown in FIG. 4, a direct reading of the reverse leakage current of the semiconductor junction under test. The current sensed by the meter $M_2$ is related to the reverse leakage current through the semiconductor junction and this will be shown by the mathematical analysis given below with respect to the circuits of FIGS. 1 and 2.

If the current indicated by the meter $M_2$ for the transistor having the characteristic of the graph of FIG. 3, is between 60 and 100 microamperes represented by the points 52 and 58 of the curves 48 and 54 for a reverse bias of minus 1 volt, a good junction is indicated. An indication exceeding 100 microamperes for the reverse leakage current denotes a defective semiconductor junction.

It is noted that on each of the curves 48, 54 and 56, the reverse leakage current is indicated at a point which lies in the saturation regions 46, 46', 46'' of the respective curves 48, 54, 56 providing a relatively small slope with a high dynamic resistance. In a situation where the reverse current characteristic of a transistor due to the failure of the transistor provides a low dynamic resistance comparable to the static resistance of the transistor, such resistance may be balanced out by the bridge 14 and it would be necessary to determine the failure of such a transistor by using another test such as a beta test to determine its defectiveness. If a high reverse voltage is applied which is great enough to bias the junction at a point of its curve where it provides a relatively low dynamic resistance due to its increased slope, the method and apparatus 10 may fail to provide the desired test. The application of such high reverse voltages which are greater than required for performing the test should be avoided to minimize damage to the semiconductor junctions to which the reverse biasing voltage is applied.

Referring particularly to FIG. 2 for the purpose of mathematical analysis of the operation of the invention, the switches $S_1$ and $S_2$ are positioned to connect the meter $M_2$ between the nodes 28 and 30, while disconnecting the null indicator $M_1$. The series resistance of the ammeter $M_2$ is shown in FIG. 2 as $R_M$. As is well known, the direct current flow into and out of any point such as node 28 of bridge 14 may be equated to zero and is represented by the following equation:

$$I_1 + I_M = I_2' + I_{CO} \qquad (1)$$

where $I_1$ is the current of arm 16 flowing into the node 28, $I_M$ is the current through the meter $M_2$ flowing into the node 28, while $I_2'$ is the current of arm 18 flowing out of the node 28, and $I_{CO}$ is the current to the transistor T flowing out of the node 28. The above equation may be solved for $I_M$ to provide the following relationship:

$$I_M = I_{CO} - I_1 + I_2' \qquad (2)$$

Using Ohm's law the direct currents $I_1$ and $I_2'$ are given by the following expressions:

$$I_1 = \frac{V_{30} + I_M R_M}{R_1} \qquad (3a)$$

$$I_2' = \frac{E_2 - V_{30} - I_M R_M}{R_2'} \qquad (3b)$$

where $V_{30}$ is the D.C. voltage measured from the node 30 of the bridge 14 to ground potential and which is seen to be equivalent to the direct current voltage drop across the resistor $R_3$. Substituting the expressions for $I_1$ and $I_2'$ of Equations 3a and 3b into Equation 2 gives:

$$I_M = I_{CO} - \frac{V_{30} + I_M R_M}{R_1} + \frac{E_2 - V_{30} - I_M R_M}{R_2'} \quad (4)$$

Solving for $I_M$ and substituting $I_{CO}$ equals $I_{CES}$ provides:

$$I_M\left[1 + \frac{R_M}{R_1} + \frac{R_M}{R_2'}\right] = I_{CO} - \frac{V_{30}}{R_1} + \frac{E_2 - V_{30}}{R_2'} \quad (5)$$

$$I_M = \frac{I_{CES} - \frac{V_{30}}{R_1} + \frac{E_2 - V_{30}}{R_2'}}{1 + \frac{R_M}{R_1} + \frac{R_M}{R_2'}} \quad (6)$$

For the case where the bridge 14 is balanced for the A.C. signal the arm 16 has its resistance adjusted to provide a resistance represented by $R_1$ giving the following relationship:

$$\frac{R_1}{R_2'} = \frac{R_3}{R_4} \quad (7)$$

For the balanced condition given above, the relationship of Equation 6 reduces to the following expression:

$$I_M = \frac{I_{CES}}{1 + \frac{R_M}{R_1} + \frac{R_M}{R_2'}} \quad (8)$$

Thus
$$I_M = K I_{CES} \quad (9)$$
where
$$K = \frac{1}{1 + \frac{R_M}{R_1} + \frac{R_M}{R_2'}} \quad (10)$$

and is a linear function if K is considered to be a constant.

Considering Equation 6, it is noted that in order for this equation to reduce to the equation of expression (8), the following equality must be proved:

$$\frac{V_{30}}{R_1} = \frac{E_2 - V_{30}}{R_2'} \quad (11)$$

Since from Equation 7

$$R_2' = \frac{R_1 R_4}{R_3} \quad (12)$$

the substitution of this equality in Equation 11 gives the following expression:

$$\frac{V_{30}}{R_1} = \frac{R_3(E_2 - V_{30})}{R_1 R_4} = \frac{1}{R_1} \cdot \frac{R_3(E_2 - V_{30})}{R_4} \quad (13)$$

Since $$V_{30} = \frac{R_3 E_2}{R_3 + R_4} \quad (14)$$

$$E_2 = \frac{V_{30}(R_3 + R_4)}{R_3} \quad (15)$$

Substituting the above for $E_2$ in Equation 13 gives:

$$\frac{V_{30}}{R_1} = \frac{1}{R_1} \cdot \frac{R_3}{R_4}\left[\frac{V_{30}(R_3 + R_4)}{R_3} - V_{30}\right] \quad (16)$$

$$\frac{V_{30}}{R_1} = \frac{V_{30}}{R_1} \cdot \frac{R_3}{R_4}\left[\frac{R_3 + R_4 - R_3}{R_3}\right] \quad (17)$$

which reduced by cancellation to the equality:

$$\frac{V_{30}}{R_1} = \frac{V_{30}}{R_1} \quad (18)$$

thereby proving that Equation 6 when subject to the balanced condition of Equation 7 reduces to Equation 8, $$I_M = \frac{I_{CES}}{1 + \frac{R_M}{R_1} + \frac{R_M}{R_2'}} \quad (8)$$

For the purpose of determining the accuracy of the leakage testing means 10 for changes in in-circuit resistance loading, consider the situation where K of Equation 9 is considered constant for the purpose of providing a linear scale for indicating reverse leakage current, as illustrated in FIG. 4. If for the purpose of calculating K in the absence of in-circuit resistance body the meter resistance $A_M$ is taken as equal to 50 ohms, $R_2$ is identical to $R_2'$ and taken equal to 500 ohms, while $R_3$ equals 500 ohms, and $R_4$ equals 100 ohms, K from Equation 10 is found to equal:

$$K_0 = \frac{1}{1 + \frac{50}{R_1} + \frac{50}{500}} \quad (19)$$

and since from the condition of Equation 7

$$R_1 = \frac{R_2' R_3}{R_4} = \frac{(500)(500)}{100} = 2500 \quad (20)$$

This gives $$K_0 = \frac{1}{1.12} = 0.0893 \quad (21)$$

Thus the scale of FIG. 4 may be calibrated with K equal to .0893 to provide a linear scale for the condition when the transistor or semiconductor junction is not connected in circuit with other resistances, since $R_2$ was taken equal to $R_2'$. Consider now the condition where in-circuit resistances of transistor T under test are connected in parallel with $R_2$ of the bridge 14. Take the situation where such resistors associated with the transistor T are equal to the resistance of the resistance $R_2$ of the arm 18, namely 500 ohms. The effective combined resistance $R_2'$ now equals 250 ohms. Again, calculating the value of K from Formula 10 with $R_M$ equal to 50 ohms, $R_2'$ equal to 250 ohms, while $R_3$ remains equal to 500 ohms and $R_4$ remains equal to 100 ohms, $$K_1 = \frac{1}{1 + \frac{50}{R_1} + \frac{50}{250}} \quad (22)$$

Resistance $R_1$ is now adjusted to be equal to 1250 ohms for the balanced condition from the relationship of Equation 7 giving:

$$K_1 = \frac{1}{1.24} = 0.0806 \quad (23)$$

The percentage error produced in the determination of the reverse leakage current is given by:

$$\text{Percent error} = \frac{K_0 - K_1}{K_0} \times 100 \quad (24)$$

$$= \frac{.85}{.0892} = 9.7\% \quad (25)$$

Thus, an error of 9.7% or less than 10% is provided in the situation where the effect of the in-circuit resistances associated with the transistor or semiconductor junction being tested has an effective value of 500 ohms or greater.

It is well known that although the particular method and apparatus was illustrated in connection with a PNP type transistor with the base to collector junction reverse bias, the method and apparatus may be applied to NPN semiconductor junctions by appropriately changing the D.C. signal polarity for reverse biasing same, as well known in the art.

It is noted that the applicant's method and apparatus is most effective for testing and measuring the reverse leakage current of a semiconductor junction when the reverse biasing voltage applied to the semiconductor junction places the operating point in the saturated region where the characteristic reverse leakage current provides a high dynamic resistance to alternating signals about the operating point. The operation of the method and apparatus is not limited to any particular device but is applicable to diodes and other semiconductor junction devices which exhibit this characteristic and to which the reverse potential is applied for testing purposes.

While this invention has been described and illustrated with reference to a specific embodiment, it is to be understood that the invention including the method and means disclosed are capable of various modifications and applications, not departing essentially from the spirit thereof, which will become apparent to those skilled in the art.

What is claimed is:

1. A method of testing the reverse leakage current of a semiconductor junction device while it is connected in a circuit comprising the steps of:
   (a) applying a signal to a junction of a semiconductor junction device while it is connected in a circuit and forward current therethrough is absent, said signal comprising a D.C. component reverse biasing the junction of said device which is to have its leakage current measured and an A.C. component having an amplitude which is small with respect to said D.C. component,
   (b) measuring the resistance with respect to said A.C. component of said signal of the circuit to which said signal is applied in step (a) above, wherein the A.C. resistance of the junction of said semiconductor device is high compared to its reverse D.C. resistance,
   (c) measuring the D.C. current flow responsive to said D.C. component of said signal when applied as in step (a) above, and
   (d) reducing the D.C. current measured in step (c) above by the D.C. current caused to flow by the D.C. component of said signal through the resistance measured in step (b) above to provide as a result a measure of the reverse leakage current of said device.

2. A method of testing the reverse leakage current of a semiconductor junction device while it is connected in a circuit comprising the steps of:
   (a) applying a signal to a semiconductor junction device while it is connected in a circuit and forward current therethrough is absent, said signal comprising a D.C. component reverse biasing the junction of said device which is to have its leakage current measured and an A.C. component of smaller amplitude than said D.C. component, and
   (b) sensing a signal derived from the D.C. current provided by the application of the D.C. component of the signal of step (a) above reduced by the D.C. current component caused to flow by said D.C. component of said signal through a resistance equal in value to the resistance provided in the A.C. component of said signal when applied to said device while said device is connected in said circuit and forward current therethrough is absent, which sensed signal provides a measure of the reverse leakage current of said device.

3. The method of claim 2 in which the signal applied to said semiconductor junction device in step (a) above is derived through an arm of a Wheatstone bridge provided with signal balancing means which receives said signal across the pair of signal input nodes of said bridge and the signal sensed in step (b) above is derived from the pair of signal output nodes of said bridge when said bridge is balanced to minimize the amplitude of the A.C. component of said signal at its said output nodes.

4. The method of claim 3 in which the reverse leakage current between the base and collector junction of a transistor is to be measured and the emitter is short circuited directly to the base of said transistor in step (a) above to prevent forward current therethrough.

5. A method of testing the reverse leakage current of a semiconductor junction device while it is connected in a circuit comprising the steps of:
   (a) applying a signal to a semiconductor junction device while it is connected in a circuit and forward current therethrough is absent, derived from an arm of a Wheatstone bridge which receives said signal across the pair of signal input nodes of said bridge, the signal applied to said semiconductor junction device comprising a D.C. component poled to reverse bias the junction of said device which is to have its leakage current measured and an A.C. component having an amplitude smaller than said D.C. component,
   (b) detecting the A.C. component of said signal at the pair of signal output nodes of said Wheatstone bridge and minimizing the amplitude of said detected A.C. component by balancing said bridge while said signal is applied to said device as specified in step (a) above, and
   (c) sensing the D.C. signal provided at said pair of output nodes of said Wheatstone bridge while applying at least the D.C. component of said signal as specified in step (a) above with said bridge in the balanced condition of step (b) above, for measuring the reverse leakage current of said device.

6. The method of claim 5 in which said bridge comprises first and second resistance arms joined together to provide the first signal output node, and third and fourth resistance arms joined together to provide the second signal output node of said pair of signal output nodes, said first and third resistance arms being joined together to provide the first signal input node while said second and fourth resistance arms are joined together to provide the second signal input node of said pair of signal input nodes, the signal applied to said device in step (a) above being derived from the second resistance arm of said bridge circuit, while said bridge is balanced by adjusting the resistance of the first resistance arm of said bridge circuit.

7. The method of claim 6 in which the reverse leakage current between the base and collector junction of a transistor is to be measured and the emitter is short circuited to the base of said transistor in step (a) above to prevent forward current therethrough.

8. A semiconductor leakage testing means for measuring the reverse leakage current of a semiconductor junction device while it is connected in a circuit comprising:
   (a) a Wheatstone bridge circuit with arms providing at their opposite junctions respectively a pair of signal input nodes and a pair of signal output nodes, at least one of said arms being adjustable for balancing said bridge circuit,
   (b) means delivering a signal to the signal input nodes of said bridge circuit, said signal comprising a D.C. component for reverse biasing the junction of said device which is to have its leakage current measured and an A.C. component having an amplitude which is small with respect to said D.C. component,
   (c) detecting means connected between the signal output nodes of said bridge circuit including an A.C. signal detector and a D.C. current sensing means, and
   (d) output means for delivering a signal from an arm of said bridge circuit for application to the junction of a semiconductor device which is to have its reverse leakage current measured, whereby when said bridge circuit is balanced for minimizing the amplitude of said A.C. component of said signal which is detected by the A.C. signal detector of said detecting means, said D.C. current sensing means provides a measure of the reverse leakage current of said device.

9. The means of claim 8 in which said arms of the bridge circuit of (a) above are provided with resistance elements, the resistance element of at least one of said arms having an adjustable resistance for balancing said bridge for minimizing the amplitude of the A.C. component of said signal detected by the A.C. signal detector of said detecting means of (c) above while the output means of (d) above delivers its said signal to the device having its reverse leakage current measured.

10. The means of claim 9 in which said bridge cir-detector is an A.C. voltmeter and the D.C. current sensing means is a D.C. ammeter.

11. The means of claim 9 in which said bridge circuit has first, second, third and fourth resistance arms, the first and second resistance arms being joined together to provide the first signal output node while the third and fourth resistance arms are joined together to provide the second signal output node, and the first and third resistance arms being joined together to provide the first signal input node while said second and fourth resistance arms are joined together to provide the second signal input node of said pair of signal input nodes.

12. The means of claim 11 in which the first resistance arm of said bridge circuit is provided with an adjustable resistance for balancing said bridge circuit and the output means of (d) above delivers a signal from the second resistance arm of said bridge circuit.

13. The means of claim 12 in which said output means of (d) above comprise first and second leads respectively connected to the first signal output node and the second signal input node of said bridge circuit.

14. The means of claim 13 wherein said semiconductor junction device is a transistor having base and emitter leads and said output means of (d) includes means for short circuiting the base and emitter leads thereof.

References Cited

UNITED STATES PATENTS

| | | | |
|---|---|---|---|
| 3,227,953 | 1/1966 | Cerveny | 324—158 |
| 3,348,145 | 10/1967 | Erath | 324—158 |

OTHER REFERENCES

G. E. Transistor Manual (6th ed.), Mar. 20, 1962, pp. 220-3.

RUDOLPH V. ROLINEC, Primary Examiner

E. L. STOLARUN, Assistant Examiner

FO-1050
(5/69)

UNITED STATES PATENT OFFICE
CERTIFICATE OF CORRECTION

Patent No. 3,510,775          Dated May 5, 1970

Inventor(s) William R. Orloff

It is certified that error appears in the above-identified patent and that said Letters Patent are hereby corrected as shown below:

Claim 10, line 1, should read -- The means of claim 9 in which the A. C. signal --

SIGNED AND
SEALED
JAN 19 1971

(SEAL)
Attest:

Edward M. Fletcher, Jr.
Attesting Officer

WILLIAM E. SCHUYLER, JR.
Commissioner of Patents